United States Patent Office 3,153,035
Patented Oct. 13, 1964

---

3,153,035
3-ACYLAMINO-7-GLYCOSYLOXYCOUMARINS AND THEIR PREPARATION
Sydney Archer, Bethlehem, and Joseph C. Collins, East Greenbush, N.Y., assignors to Sterling Drug Inc., New York, N.Y., a corporation of Delaware
No Drawing. Filed Mar. 22, 1962, Ser. No. 181,773
15 Claims. (Cl. 260—210)

This invention relates to novel coumarin compounds and in particular is concerned with glycosides of 3-acylamino-4,7-dihydroxy-coumarins and with intermediates and processes for their preparation.

One aspect of our invention relates to valuable new 3-acylamino-4-hydroxy-7-glycosyloxy-8 - (Z) - coumarins having the formula:

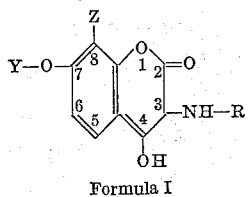

Formula I wherein R is carboxylic-acyl; Y is glycosyl; and Z is a member of the group consisting of H and lower-alkyl.

Another aspect of our invention relates to processes for preparing said glycosyloxy-coumarins which comprises reacting a 3-acylamino-4,7-dihydroxy - 8 - (Z) - coumarin with a 1-halo-pentose or a 1-halohexose in the presence of an acid-acceptor.

In the above general Formula I, R represents carboxylic acyl having from one to about twenty carbon atoms and having a molecular weight in the approximate range 29–300. Representative of the acyl radicals are alkanoyl, for example, formyl, acetyl, propionyl, butyryl, isobutyryl, caproyl, octanoyl, decanoyl, octadecanoyl, and the like; alkenoyl, for example, acryloyl, methacryloyl, 10-undecanoyl, and the like; monocarbocyclic-aryl-lower alkenoyl, for example, cinnamoyl; monocyclic-aromatic carboxylic-acyl that is, radicals having one aromatic ring which can be benzenoid or 5- or 6-membered heteroaromatic, for example, benzoyl, and benzoyl substituted by from one to three substituents such as lower-alkyl, hydroxy, lower-alkoxy and the like, 2-thenoyl, isonicotinoyl, 2-furoyl, 5-nitro-2-furoyl, and the like; and mono- or polysubstituted lower-alkanoyl, for example, chloracetyl, α-bromopropionyl, dichloracetyl, cyanoacetyl, and the like. Preferred acyl radicals represented by R are alkanoyl and aroyl having the formula

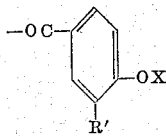

wherein R' is lower-alkyl or lower-alkenyl having from three to seven carbon atoms and X is H, lower alkyl or monocarbocyclicaryl-lower-alkyl. Examples of the preferred acyl radicals are acetyl, propionyl, decanoyl, octadecanoyl, 4-hydroxy-3-(3-methyl-butyl)benzoyl, 4-methoxy-3-(3-methyl-2-butenyl)benzoyl, 4 - benzyloxy-3-(3-methylbutyl)benzoyl, and 4-hydroxy-3-(3-methyl-2-butenyl)-benzoyl.

In the general Formula I above, Y is glycosyl selected from the group consisting of pentosyl and hexosyl. Pentosyl and hexosyl are glycosyl radicals derived respectively from pentose and hexose monosaccharides and the lower-alkyl ethers and lower-carboxylic-acyl esters thereof. Lower-alkyl ethers of monosaccharides from which the glycosyl radicals are derived contain lower-alkyl groups having from one to about six carbon atoms, the hydrogen atom of each free hydroxyl group of the monosaccharide being replaced by a lower-alkyl group. Lower-carboxylic-acyl esters of mono-saccharides from which the glycosyl radicals are derived contain lower-carboxylic-acyl groups of the lower-alkanoyl class having from one to about six carbon atoms and of the monocarbocyclic-aroyl class, the hydrogen atom of each free hydroxyl group of the monosaccharide being replaced by a lower-carboxylic-acyl group. Representative of the lower-alkanoyl esters are formyl, acetyl, propionyl and hexanoyl esters. Representative of monocarbocyclic-aroyl esters are benzoyl, p-toluyl, p-nitrobenzoyl, and 3,4,5-trimethoxybenzoyl esters. Representative examples of pentosyl and hexosyl radicals represented in Formula I by Y are glucosyl, galactosyl, xylosyl, arabinosyl, ribosyl, tetra-O-acetylglucosyl, tri-O-benzoylribosyl, tetra-O-methylglucosyl, tetra-O-ethylgalactosyl, and the like.

The compounds of the invention are prepared by reacting a 3-acylamino-4,7-dihydroxy-coumarin of the formula

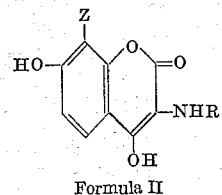

Formula II with a 1-halopentose or a 1-halohexose in the presence of an acid-acceptor. As halopentoses and halohexoses, we prefer to use chloro- and bromo-pentoses and -hexoses which are prepared by known methods. An acid-acceptor is a substance capable of reacting with the hydrogen halide evolved as a by-product of the reaction. Suitable acid-acceptors are metal hydroxides and oxides. We prefer alkali metal hydroxides, such as sodium and potassium hydroxide, and silver oxide as acid-acceptors. The reaction can be carried out by warming the reactants to a maximum of about 60° or allowing them to react at room temperature, i.e., 20–30° C. We usually prefer to allow the reaction to proceed at room temperature in a suitable solvent. Examples of such suitable solvents for the reaction include cyclic ethers, for example dioxane and tetra-hydrofuran; lower alkyl alcohols, for example methanol, ethanol, and propanol; low molecular weight ketones, for example, acetone and methyl ethyl ketone; aromatic heterocyclic solvents, for example pyridine and quinoline; and mixtures of the foregoing. When silver oxide is used as the acid acceptor, we usually prefer to employ quinoline or dioxane as the solvent.

When an alkali metal hydroxide is employed as an acid-acceptor, the product is a 7-glycoside; when silver oxide is used as the acid-acceptor, a 4,7-diglycoside is produced. The 4-glycosidic linkage of the intermediate 4,7-diglycoside is hydrolyzed by warming the latter with an acid such as acetic acid or a dilute mineral acid, or with a dilute base, for example a dilute solution of an alkali metal hydroxide.

The intermediate compounds of Formula II are prepared by causing a 3-amino-4,7-dihydroxy-8-Z-coumarin to react at 10–30° C. with an acylating agent, for example an acyl halide or an acid anhydride, in the presence of an acid acceptor, followed by selective hydrolysis of the 7-acyloxy linkage of the first-formed 3-acylamino-7-acyloxy-4-hydroxycourmarin with a dilute solution of an alkali metal hydroxide, for example 5 percent sodium hydroxide solution.

The compounds of Formula I are useful as antibacterial agents. They have in vitro antibacterial activity; and, in particular, they have bactericidal activity against such organisms as Staphylococcus aureus, Clostridium welchii,

*Eberthella typhi, Pseudomonas aeruginosa* and *Mycobacterium tuberculosis.*

The structure of the compounds of the invention was established by the mode of synthesis, infrared spectral data, and the elementary analyses of representative samples.

The following examples will further illustrate the invention without limiting the latter thereto.

Example 1

3 - acetamido - 4,7-bis(tetra-O-acetyl-β-D-glucopyranosyloxy)-coumarin [Formula I: R=CH₃CO; X and Y=tetra-O-acetyl-β-D-glucopyranosyl; and Z=H].—3-acetamido-4,7-dihydroxycoumarin (1.18 grams, 5.0 mmol.) and tetra-acetyl-α-bromoglucose (9.0 grams, 22.8 mmol.) were stirred in 15 ml. of quinoline while 5.0 grams (21.6 mmol.) of silver oxide was added. The resulting brown mixture was stirred for twenty minutes with occasional external cooling. The reaction mixture was allowed to stand for three hours; then 40 ml. of acetic acid was added and the mixture was filtered. On pouring the filtrate into ice water, the product separated as a precipitate which was collected and recrystallized from ethanol. The product was then slurried with activated magnesium silicate in hot benzene and recrystallized several times from 95 percent ethanol. The pure 3-acetamido-4,7-bis(tetra - O - acetyl-β-glucopyranosyloxy)coumarin thus prepared melted at 183.6–186.2° C. (corr.). The rotation was $[\alpha]_D^{25}$ (1 percent in chloroform)=—48.1°.

Example 1A

The intermediate 3-acetamido-4,7-dihydroxycoumarin was prepared by selective hydrolysis of the acetoxy group of 3-acetamido-7-acetoxy-4-hydroxycoumarin by allowing a solution of the latter compound in 5 percent sodium hydroxide solution to stand at room temperature for one hour, acidifying the solution to pH 2, and collecting the solid product, 3-acetamido-4,7-dihydroxycoumarin, which melted at 273–284° C. after recrystallization from isopropyl alcohol.

Example 2

3 - acetamido-4-hydroxy-7-(tetra-O-acetyl-β-D-glucopyranosyloxy)coumarin [Formula I: R=CH₃CO; X and Z=H; and Y=tetra-O-acetyl-β-D-glucopyranosyl].—To a solution containing 1.18 grams (5.0 mmol.) of 3-acetamido-4,7-dihydroxy coumarin in 12.0 ml. of 0.83 N. potassium hydroxide and 5 ml. of acetone containing a few drops of 1 percent phenolphthalein in acetone was added a solution containing 8.0 grams of tetra-acetyl-α-bromoglucose in 20 ml. of acetone. The resulting two-phase solution was stirred and maintained slightly basic with additional potassium hydroxide solution. The reaction mixture was concentrated to one-half its volume under reduced presure, and 200 ml. of ethyl acetate was added. The ethyl acetate extract was extracted with 10 percent sodium carbonate solution, and the aqueous extracts were acidified with dilute hydrochloric acid. Extraction with ethyl acetate and evaporation of the solvent gave a crude solid which was recrystallized from ethanol. Repeated recrystallizations gave pure 3-acetamido-4-hydroxy - 7 - (tetra-O-acetyl-β-D-glucopyranosyloxy)-coumarin which melted at 226.6–227.4° C. (corr.). The rotation was $[\alpha]_D^{25}$=—31.9° (1 percent in chloroform).

Example 2A

3 - acetamido-4-hydroxy-7-(tetra-O-acetyl-β-D-glucopyranosyloxy)coumarin was also prepared by the selective hydrolysis of the 4-glycosidic linkage of 3-acetamido-4,7 - bis(tetra - O-acetyl-β-D-glucopyranosyloxy)coumarin (Example 1) with acetic acid. A solution containing 0.200 g. of the bis-glycoside in 5.0 ml. of glacial acetic acid was heated for 1 hour on a steam-bath. The solution was diluted with 30 ml. of water, and the product was allowed to crystallize. The 3-acetamido-4-hydroxy-7-(tetra-O-acetyl-β-D-glucopyranosyloxy)coumarin thus prepared melted at 228–228.5° C. Mixed melting point and infrared spectral data showed the product to be identical with that prepared in Example 2 above.

Example 3

3 - acetamido - 7-(β-D-glucopyranosyloxy)-4-hydroxycoumarin, sodium salt [Formula I: R=CH₃CO; X=Na; Y=β-D-glucopyranosyl; and Z=H].—To a solution containing 2.26 grams (4.0 mmol.) of 3-acetamido-4-hydroxy - 7-tetra-O-acetyl-β-D-glucopyranosyloxy-coumarin in 100 ml. of absolute methanol was added 16 ml. of 0.265 N. sodium methoxide in methanol. The mixture became homogeneous rapidly. The reaction mixture was allowed to stand overnight. It was then filtered, 0.2 ml. of water were added, and the solution was evaporated to dryness. The product was recrystallized from absolute methanol-ethyl acetate. The pure sodium 3-acetamido-7-(β-D-glucopyranosyloxy)-4-hydroxycoumarin thus produced melted at 222.4–226.2° C. (corr.) with decomposition. The rotation was $[\alpha]_D^{25}$=—68.2° (1 percent in water).

Example 4

3-decanoylamino-4-hydroxy-7-(tetra-O-acetyl-β-D-glucopyranosyloxy)coumarin [Formula I: R=n-decanoyl; X and Z=H; Y=tetra - O - acetyl-β-D-glucopyranosyl].—To a solution containing 8.0 grams (0.023 mole) of 3-decanoylamino-4,7-dihydroxycoumarin in 45 ml. of quinoline was added 12.0 grams of silver oxide. The slurry was stirred for about ten minutes at room temperature, and then 21.0 grams of tetra-acetyl-α-bromoglucose was added. Stirring was continued for about one-half hour with occasional cooling. The reaction mixture was then allowed to stand for about 2.5 hours at room temperature. About 150 ml. of acetic acid was then added and the mixture was diluted to 800 ml. with water. After allowing the mixture to stand for about twenty hours in an ice bath, the aqeous phase was decanted from the precipitated gum. The latter, consisting of crude 3-decanoylamino - 4,7-bis(tetra-O-acetyl-β-D-glucopyranosyloxy) coumarin, was dissolved in about 200 ml. of acetic acid and the solution was heated on a steam bath for about one hour. This procedure selectively hydrolyzed the 4-glycosidic linkage. About one-half the solvent was then removed under reduced pressure and the remaining solution was diluted with water until a gum separated. Repeated recrystallization of the gum from isopropanol-water gave the pure product, 3-decanoylamino-4-hydroxy - 7-(tetra-O-actyl-β-D-glucopyranosyloxy)coumarin, which melted at 131.8–133.0° C. (corr.).

Example 4A

The intermediate 3-decanoylamino-4,7-dihydroxycoumarin was prepared by acylating 3-amino-4,7-dihydroxycoumarin hydrochloride in pyridine with two molecular equivalents of decanoyl chloride and selectively hydrolyzing the O-acyl group from the resulting 3-decanoylamino-7-decanoyloxy-4-hydroxycoumarin by the method given in Example 1A. The 3-decanoylamino-4,7-dihydroxycoumarin thus prepared melted at 150–152° C., after recrystallization from aqueous ethanol.

Example 5

3 - acetamido-4-hydroxy-8-methyl-7-(tetra-O-acetyl - β-D-glucopyranosyloxy)coumarin [Formula I: R=CH₃CO; X=H; Y=tetra - O-acetyl - β - D - glucopyransoyl; and Z=CH₃].—Following the procedure given in Example 4, 1.5 grams (6 mmol.) of 3-acetamido-4,7-dihydroxy-8-methylcoumarin was reacted with 5.4 grams (13 mmol.) of tetra-O-acetyl-α-bromoglucose in the presence of 3.0 grams of silver oxide in quinoline. The 4-glucosidic linkage of the resulting 3-acetamido-8-methyl-4,7-bis(tetra-O-acetyl-β-D-glucopyranosyloxy)coumarin was hydrolyzed by heating the crude product in 15 ml. of glacial acetic acid. Following recrystallization from aqueous acetone and from acetone-ethanol, the pure 3-acetamido-4-hydroxyl-8-methyl-7 - (tetra-O-acetyl-β-D - glucopyranosyloxy)coumarin melted at 279.2–280.6° C. (corr.). The rotation was [α]$_D^{25}$=—49.6° (1 percent chloroform).

Example 5A

The intermediate 3-acetamido-4,7-dihydroxy-8-methylcoumarin was prepared by selectively hydrolyzing 3-acetamido-7-acetoxy-4-hydroxy-8-methylcoumarin according to the method given in Example 1A. The 3-acetamido-4,7-dihydroxy-8-methylcoumarin thus prepared melted at 274°, following recrystallization from isopropyl alcohol.

Example 6

*3-[4-benzyloxy-3-(3-methylbutyl)benzamido] - 4 - hydroxy-8-methyl-7-(tetra - O - acetyl-β-D - glucopyranosyloxy)coumarin* [Formula I: R=4-benzyloxy-3-(3-methylbutyl)benzamido; X=H; Y=tetra-O-acetyl-β-D-glucopyranosyl; and Z=CH$_3$].—Following the procedure given in Example 4, 2.00 grams (4.1 mmol.) of 3-[4-benzyloxy-3-(3-methylbutyl)benzamido]-4,7-dihydroxy - 8 - methylcoumarin was reacted with 5.00 grams (12.2 mmol.) of tetra-acetyl-α-bromoglucose in the presence of 3.00 grams of silver oxide in 20 ml. of quinoline. The 4-glucosidic linkage of the 4,7-bis-(tetra-O-acetylglucopyranosyl-4-[benzyloxy - 3-(3-methylbutyl)benzamido]-8-methylcoumarin thus produced was hydrolyzed by heating with acetic acid. Following repeated recrystallization from acetone-isopropyl alcohol, the pure 3-[4-benzyloxy-3-(3-methylbutyl)benzamido] - 4 - hydroxy-8-methyl-7-(tetra-O-acetyl-β-D - glucopyranosyloxy)coumarin melted at 235.6–239.4° C. (corr.). The rotation was $$[\alpha]_D^{25} = -38.2°$$

(1 percent in chloroform).

Example 6A

The intermediate 3-[4-benzyloxy-3-(3 - methylbutyl)benzamido]-4,7-dihydroxy-8-methylcoumarin was prepared by refluxing sodium dihydronovobiocin in methanol with excess benzyl bromide in the presence of excess sodium methoxide until the pH of the reaction mixture was pH 3, followed by hydrolysis of the glyosidic linkage with hydrogen chloride in methanol. The melting point of 3-[4-benzyloxy-3-(3-methylbutyl)benzamido]-4,7 - dihydroxy-8-methylcoumarin after recrystallization from isopropyl alcohol was 243.0–244.8° C. (corr.),

Example 7

*4-hydroxy-3-[4-hydroxy-3-(3-methylbutyl)benzamido]-8-methyl-7-(tetra-O-acetyl- -D - glucopyranosyloxy)coumarin* [Formula I: R=4-hydroxy-3-(3-methylbutyl)benzamido; X=H; Y=tetra-O-acetyl-β-glucopyranosyl; and Z=CH$_3$].—In a bottle-type hydrogenator 0.65 grams (0.8 mmol.) of 3-[4-benzyloxy-3-(3-methylbutyl)benzamido] - 4-hydroxy-8-methyl-7-tetra-O-acetyl-β-D-glucopyranosyloxycoumarin dissolved in 100 ml. of tetrahydrofuran and 125 ml. of 95 percent ethanol was hydrogenated over 0.2 gram of 10 percent palladium-on-charcoal. The hydrogenation was carried out for one and a half hours at room temperature under 30 lbs. per sq. inch of hydrogen. The catalyst was filtered off and the solution was evaporated to dryness. Following repeated recrystallization from aqueous acetone, the product, 4-hydroxy - 3 - [4-hydroxy-3-(3-methylbutyl)benzamido]-8-methyl-7-tetra-O-acetyl-β-D - glucopyranosyloxycoumarin, melted indefinitely starting at 222.6° C. (corr.). The rotation was [α]$_D^{25}$=—53.4° (1 percent chloroform).

Example 8

*4-hydroxy-8-methyl - 3 - [3-(3-methylbutyl) - 4-methoxybenzamido] - 7- (tetra-O-acetyl-β-D - glucopyranosyloxy)coumarin* [Formula I: R=3-(3-methylbutyl)-4-methoxybenzamido; X=H; Y=tetra-O-acetyl-β-D-glucopyranosyl; and Z=CH$_3$].—Following the procedure given in Example 4, 1.00 gram (2.43 mmol.) of 3-[3-(3-methylbutyl)-4-methoxybenzamido] - 4,7 - dihydroxy-8-methylcoumarin was reacted with 3.00 grams (7.29 mmol.) of tetra-acetyl-α-bromoglucose in the presence of 1.70 grams (7.35 mmol.) of silver oxide in quinoline. The 4-glycosidic linkage of the intermediate 4,7-bis(tetra-O-acetyl-β-D-glucopyranosyl)-3-[3-(3 - methylbutyl) - 4-methoxybenzamido]-8-methylcoumarin thus produced was hydrolyzed by heating with glacial acetic acid. Following recrystallization from acetone-isopropyl alcohol, the pure 4-hydroxy-8-methyl-3-[3-(3-methylbutyl) - 4-methoxybenzamido]-7-(tetra-O-acetyl-β-D - glucopyranosyloxy)coumarin melted at 222.4–224.2° C. (corr.).

Example 8A

The intermediate 3-[4-methoxy-3-(3-methylbutyl)benzamido]-4,7-dihydroxy-8-methylcoumarin was prepared by methylation of sodium dihydronovobiocin with dimethyl sulfate in an aqueous solution of sodium hydroxide followed by hydrolysis of the glycosidic linkage by refluxing the resulting methyl ether of dihydronovobiocin in methanolic hydrogen chloride. The melting point of 3-[4-methoxy-3-(3-methylbutyl)benzamido] - 4,7 - dihydroxy-8-methylcoumarin thus produced, after recrystallization from absolute ethanol was 238.8–239.8° C. (corr.).

Example 9

*4-hydroxy - 8 - methyl-3-[3-(3-methyl-2-butenyl) - 4-methoxybenzamido] - 7 - (tetra-O-acetyl-β-D-glucopyranosyloxy)coumarin* [Formula I: R=3-(3-methyl-2-butenyl)-4-methoxybenzamido; X=H, Y=tetra-O-acetyl-β-D-glucopyranosyl; Z=CH$_3$].—Following the procedure given in Example 4, 2.00 grams (4.9 mmol.) of 3-[3-(3-methyl-2-butenyl)-4-methoxybenzamido]-4,7 - dihydroxy-8-methylcoumarin was reacted with 6.00 grams (14.5 mmol.) of tetra-acetyl-α-bromoglucose in the presence of 3.40 grams (14.7 mmol.) of silver oxide in quinoline. The 4-glycosidic linkage of the intermediate 4,7-bis-(tetra-O-acetylglucopyranosyl)-3-[3-(3-methyl - 2 - butenyl)-4-methoxybenzamido]-8-methylcoumarin thus produced was hydrolyzed by heating the intermediate product in 35 ml. of glacial acetic acid for one hour. Following repeated recrystallization from acetone, the pure 4-hydroxy-8 - methyl-3-[3-(3-methyl-2-butenyl) - 4 - methoxybenzamido]-7-tetra-O-acetyl - β - D-glucopyranosyloxycoumarin, melted at 225.2–233.0° C. (corr.). The rotation was [α]$_D^{25}$=—37.4° (1 percent in chloroform).

Example 9A

The intermediate 3-[4-methoxy-3-3-methylbutenyl)benzamido]-4,7-dihydroxy-8-methylcoumarin was produced by hydrolysis of the glycosidic linkage of the monomethyl ether of novobiocin in refluxing methanolic hydrogen chloride. Recrystallized from ethanol, the 3-[4-methoxy-3-(3-methylbutenyl)benzamido]-4,7 - dihydroxy-8-methylcoumarin thus produced melted at 262–265.8° C.

Example 10

*3-[4-methoxy - 3 - (3-methylbutyl)benzamido]-4-hydroxy-7-(tetra-O-acetyl-L - galactosyloxy) - 8 - methylcoumarin* [Formula I: R=4-methoxy-3-(3-methylbutyl)benzamido; X=H; Y=tetra - O - acetyl-L-galactosyl; Z=CH$_3$].—Following the procedure given in Example 1, 6.0 g. of tetra-O-acetyl-L-bromogalactose was reacted with 2.0 g. of 4,7-dihydroxy-3-[4-methoxy-3-(3-methylbutyl)benzamido]-8-methylcoumarin in the presence of 3.4 g. of silver oxide in 16 ml. of quinoline. Following chromatography on activated magnesium silicate and recrystallization from ether-isopropyl ether, the product, 3-[4-methoxy - 3 - (3 - methylbutyl)benzamido]-4-hydroxy-7-(tetra-O-acetyl - L - galactosyloxy) - 8-methylcoumarin, melted at 136–138° C.

Example 11

*4-hydroxy - 3 - [4 - methoxy-3-(3 - methylbutyl)benzamido]-8-methyl - 7 - (trio-O-benzoyl-β-D-ribopyrano-* syloxy)coumarin [Formula I: R=4-methoxy-3-(3-methylbutyl)benzamido; X=H; Y=trio-O-benzoyl-β-D-ribopyranosyl; and Z=CH₃].—Following the procedure given in Example 4, 2.00 grams of 4,7-dihydroxy-3-[4-methoxy-3-(3-methylbutyl)benzamido] - 8 - methylcoumarin was recated with 7.4 g. of tri-O-benzoyl-D-bromoribopyranose in the presence of 3.4 grams of silver oxide in 16 ml. of quinoline. Recrystallized from aqueous ethanol, the product, 4-hydroxy-3-[4-methoxy-3-(3-methylbutyl)benzamido] - 8 - methyl-7-(trio-O-benzoyl-β-D-ribopyranosyloxy)coumarin melted at 244–258° C.

Example 12

3-dichloroacetamido - 4 - hydroxy - 7-(tetra-O-acetyl-β-D-glucopyranosyloxy)coumarin [Formula I: R=dichloroacetyl: X and Z=H; Y=tetra-O-acetyl-β-D-glucopyransoyl].—Following the procedure given in Example 4, 3-dichloroacetamido - 4 - hydroxy-7-(tetra-O-acetyl-β-D-glucopyranosyloxy) coumarin can be prepared from tetra-acetyl-α-bromoglucose and 3-dichloroacetamido-4,7-dihydroxycoumarin.

The intermediate 3-dichloroacetamido-4,7-dihydroxycoumarin was prepared by causing 3-amino-4,7-dihydroxycoumarin hydrochloride to react with chloral hydrate and sodium carbonate in the presence of sodium cyanide. Upon acidification of the ice-cooled reaction mixture of pH 2 with concentrated hydrochloric acid, crude 3-dichloroacetamido-4,7-dihydroxycoumarin precipitated, which after recrystallization from aqueous isopropyl alcohol, melted at 243.6–246.6° C. (corr.).

Example 13

3-isobutyramido - 4 - hydroxy - 7-(tetra-O-methyl-β-D-glucopyranosyloxycoumarin [Formula I: R=isobutyryl; X and Z=H; Y=tetra-O-methyl-β-D-glucopyranosyl].— Following the procedure given in Example 4, 3-isobutyramido-4-hydroxy - 7 - (tetra-O-methyl-β-D-glucopyranosyloxy)coumarin can be prepared from tetra-methyl-α-chloroglucose and 4,7 - dihydroxy-3-isobutyramidocoumarin.

Example 14

3-benzamido - 4 - hydroxy - 7-(tetra-O-acetyl-β-D-glucopyranosyloxy)coumarin [Formula I: R=benzoyl; X and Z=H; Y=tetra-O-acetyl-β-D-glucopyranosyl].— Following the procedure given in Example 4, 3-benzamino - 4 - hydroxy - 7 - (tetra-O-acetyl-β-D-glucopyranosyloxy)coumarin can be prepared from tetra-acetyl-α-chloroglucose and 4,7 - dihydroxy-3-benzamidocoumarin.

Example 15

3-cinnamoylamino - 4 - hydroxy-7-(tetra-O-acetyl-β-D-glucopyranosyloxy)coumarin [Formula I: R=cinnamoyl; X and Z=H; Y=tetra-O-acetyl-β-D-glucopyranosyl].—Following the procedure given in Example 4, 3-cinnamoylamino-4-hydroxy-7-(tetra-β - D-glucopyranosyloxy)coumarin can be prepared from tetra-acetyl-α-bromoglucose and 3 - cinnamoylamino-4,7-dihydroxycoumarin.

Example 16

4-hydroxy - 3 - isonicotinoylamino-7-tetra-O-acetyl-β-D-glucopyranosyloxycoumarin [Formula I: R=isonicotinoyl; X and Z=H; Y=tetra-O-acetyl-β-D-glucopyranosyl].—Following the procedure given in Example 4, 4-hydroxy-3-isonicotinoylamino - 7 - (tetra-O-acetyl-β-D-glucopyranosyloxy)coumarin can be prepared from tetra-acetyl-α-bromoglucose and 4,7-dihydroxy-3-isonicotinoylaminocoumarin.

The compounds described and claimed herein are, of course, set forth structurally in Formula I as coumarins. However, alternatively, they can be represented as the tautomeric 3-acylamino-2-hydroxy-7-glycosyloxy - 8-(Z)-chromones, having the following formula:

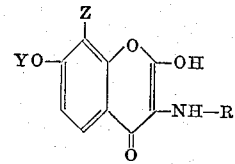

Formula III wherein R, Y, and Z are identical with the groups represented in Formula I.

We claim:
1. A compound of the formula

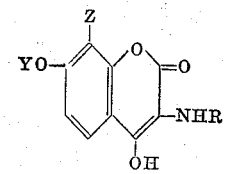

wherein R is carboxylic-acyl containing from one to about twenty carbon atoms and having a molecular weight in the approximate range 29–300; Y is glycosyl selected from the group consisting of pentosyl and hexosyl; and Z is a member selected from the group consisting of H and lower alkyl.

2. 3-alkanoylamino - 4 - hydroxy-7-hexosyloxycoumarin, wherein alkanoylamino contains from one to twenty carbon atoms.

3. 3-(monocarbocyclic-aroylamino) - 4 - hydroxy-7-hexosyloxy-8-methylcoumarin, wherein monocarbocyclic-aroylamino contains from ten to twenty carbon atoms.

4. 3-alkanoylamino - 4 - hydroxy - 7-hexosyloxy-8-methylcoumarin wherein alkanoylamino contains from one to twenty carbon atoms.

5. 3-acetamido - 4 - hydroxy - 7-(tetra-O-acetyl-β-D-glucopyranosyloxy)coumarin.

6. 3-[4-benzyloxy - 3 - (3-methylbutyl)benzamido]-4-hydroxy-8-methyl-7-(tetra-O-acetyl - β - D-glucopyranosyloxy)coumarin.

7. 3-acetamido - 4,7 - bis(tetra-O-acetyl-β-D-glucopyranosyloxy)coumarin.

8. 4-hydroxy - 3 - [4 - hydroxy-3-(methylbutyl)benzamido]-8-methyl - 7 - (tetra-O-acetyl-β-D-glucopyranosyloxy)coumarin.

9. 4-hydroxy - 3 - [4-methoxy-3-(3-methylbutyl)benzamido]-8 - methyl - 7 - (tri-O-benzoyl-β-D-ribopyranosyloxy)coumarin.

10. 3-dichloroacetamido-4,7-dihydroxycoumarin.

11. 3-[4-benzyloxy - 3 - (3-methylbutyl)benzamido]-4,7-dihydroxy-8-methylcoumarin.

12. 7-acetoxy - 3 - [4 - benzyloxy-3-(3-methylbutyl) benzamido]-4-hydroxy-8-methylcoumarin.

13. 4,7-dihydroxy - 8 - methyl-3-[3-(3-methyl-butyl)-4-methoxybenzamido]coumarin.

14. 4,7-dihydroxy - 8 - methyl-3-[3-(3-methyl-2-butenyl)-4-methoxybenzamido]coumarin.

15. 3-decanoylamino - 7 - decanoyloxy-4-hydroxycoumarin.

References Cited in the file of this patent

UNITED STATES PATENTS

| | | |
|---|---|---|
| 2,616,889 | Velluz et al. | Nov. 4, 1952 |
| 2,680,747 | Williams et al. | June 8, 1954 |
| 2,723,276 | Grussner et al. | Nov. 8, 1955 |
| 2,929,821 | Hoeksema et al. | Mar. 22, 1960 |
| 2,938,900 | Walton et al. | May 31, 1960 |
| 2,966,484 | Walton et al. | Dec. 27, 1960 |
| 2,966,509 | Stammer | Dec. 27, 1960 |

UNITED STATES PATENT OFFICE
CERTIFICATE OF CORRECTION

Patent No. 3,153,035            October 13, 1964

Sydney Archer et al.

It is hereby certified that error appears in the above numbered patent requiring correction and that the said Letters Patent should read as corrected below.

Column 3, line 39, for "273-284° C." read -- 273-274° C. --; column 5, line 50, for "- -D-" read -- -β-D- --; column 6, line 75, for "trio-", in italics, read -- tri- --, in italics; column 7, lines 2 and 10, for "trio-", each occurrence, read -- tri- --; lines 16 and 17, for "glucopyransoyl]" read -- glucopyranosyl] --; same column 7, line 27, for "of" read -- to --; column 8, line 45, for "-3-(methylbutyl)" read -- -3-(3-methylbutyl) --.

This certificate supersedes Certificate of Correction issued May 11, 1965.

Signed and sealed this 3rd day of August 1965.

(SEAL)
Attest:

ERNEST W. SWIDER  
Attesting Officer

EDWARD J. BRENNER  
Commissioner of Patents